US00RE47794E

(19) United States
(12) Reissued Patent
Ogura et al.

(10) Patent Number: US RE47,794 E
(45) Date of Reissued Patent: Dec. 31, 2019

(54) POWER SUPPLY APPARATUS AND DISPLAY APPARATUS

(75) Inventors: Noburo Ogura, Kanagawa (JP); Yoshiki Oyama, Kanagawa (JP); Nobuhiko Kanoi, Saitama (JP); Takako Ogura, legal representative, Kanagawa (JP)

(73) Assignee: Saturn Licensing LLC, New York, NY (US)

(21) Appl. No.: 13/560,215

(22) Filed: Jul. 27, 2012

Related U.S. Patent Documents

Reissue of:
(64) Patent No.: 7,764,022
Issued: Jul. 27, 2010
Appl. No.: 10/565,067
PCT Filed: Dec. 3, 2004
PCT No.: PCT/JP2004/018418
§ 371 (c)(1),
(2), (4) Date: Jan. 17, 2006
PCT Pub. No.: WO2005/112245
PCT Pub. Date: Nov. 24, 2005

(30) Foreign Application Priority Data

May 17, 2004 (JP) ..... P2004-145987

(51) Int. Cl.
*G05F 1/00* (2006.01)
*G09G 3/36* (2006.01)
(Continued)

(52) U.S. Cl.
CPC ..... *H05B 33/0815* (2013.01); *H02M 7/53803* (2013.01); *H05B 33/0818* (2013.01)

(58) Field of Classification Search
CPC .. G09G 3/3406; G09G 3/3696; G09G 3/3233; G09G 2320/0646; G09G 2360/16;
(Continued)

(56) References Cited

U.S. PATENT DOCUMENTS 5,959,857 A 9/1999 Nagahara
6,232,806 B1 5/2001 Woeste et al.
(Continued)

FOREIGN PATENT DOCUMENTS

CN 1187062 A 7/1998
CN 1363198 A 8/2002
(Continued)

OTHER PUBLICATIONS

Office Action from Japanese Application No. 2010-188060, dated Jul. 16, 2013.
(Continued)

*Primary Examiner* — Henry N Tran
(74) *Attorney, Agent, or Firm* — Lerner, David, Littenberg, Krumholz & Mentlik, LLP

(57) ABSTRACT

A liquid crystal display apparatus is capable of reducing a power loss incurred by a power-supply section in a process of generating a power-supply voltage for driving a backlight section. In the configuration of the power-supply section, a main power-supply circuit and an inverter circuit (or a DC-DC converter) are connected to an input-voltage generation unit in parallel to each other, which is used for rectifying and smoothing the commercial alternative current power. The main power-supply circuit and the inverter circuit (or the DC-DC converter) each include an isolation transformer including a primary-side winding not isolated from the commercial alternative current power and a secondary winding provided on the secondary side. The direct current input voltage is supplied to the primary side to be subjected to a power conversion process to generate an output voltage on the secondary side of the isolation transformer. Thus, the number of power conversion process stages for supplying power to the backlight section connected to the inverter circuit (or the DC-DC converter) is
(Continued)

reduced by 1. As a result, the power loss incurred by the power-supply section can be reduced to a value smaller than that of the conventional one.

22 Claims, 8 Drawing Sheets

(51) Int. Cl.
*H05B 33/08* (2006.01)
*H02M 7/538* (2007.01)

(58) Field of Classification Search
CPC ..... G09G 2330/021; G09G 2330/02; G06F 3/038; H02M 7/53803; H02M 2001/007; H02M 2001/008; H05B 33/08105; H05B 33/0866; H05B 33/0815; H05B 41/2827
USPC ..... 315/247, 185 S, 224, 276–289, 291, 315/307–326, 225, 246; 345/211–214, 345/204–207, 102, 82
See application file for complete search history.

(56) References Cited

U.S. PATENT DOCUMENTS

| | | | | |
|---|---|---|---|---|
| 6,577,512 | B2 | 6/2003 | Tripathi et al. | |
| 6,597,130 | B2 * | 7/2003 | Lee et al. | 315/294 |
| 6,891,338 | B2 * | 5/2005 | Kubo | 315/291 |
| 6,936,975 | B2 * | 8/2005 | Lin | H05B 41/282 315/224 |
| 6,954,364 | B2 * | 10/2005 | Min | H02M 7/53871 315/255 |
| 6,975,695 | B1 | 12/2005 | Kuhn | |
| 7,042,170 | B2 * | 5/2006 | Vakil | H05B 41/2828 315/224 |
| 7,253,565 | B2 * | 8/2007 | Kang | H05B 41/3927 315/167 |
| 7,315,464 | B2 * | 1/2008 | Sawada et al. | 363/159 |
| 7,319,600 | B2 * | 1/2008 | Lee | G09G 3/36 363/21.02 |
| 7,641,358 | B1 * | 1/2010 | Smith et al. | 362/183 |
| 8,390,561 | B2 * | 3/2013 | Lee et al. | 345/102 |
| 2001/0024112 | A1 | 9/2001 | Jacobs et al. | |
| 2002/0135572 | A1 * | 9/2002 | Weindorf | 345/204 |
| 2003/0043748 | A1 | 3/2003 | Gabara | |
| 2003/0085749 | A1 | 5/2003 | Xu et al. | |
| 2003/0132721 | A1 | 7/2003 | Jacobs et al. | |
| 2004/0012556 | A1 * | 1/2004 | Yong | G06F 3/0202 345/102 |
| 2004/0075402 | A1 * | 4/2004 | Morishita | 315/308 |
| 2004/0145584 | A1 * | 7/2004 | Lee et al. | 345/212 |
| 2005/0212790 | A1 * | 9/2005 | Lin et al. | 345/204 |
| 2005/0237010 | A1 * | 10/2005 | Ying et al. | 315/312 |
| 2006/0192501 | A1 | 8/2006 | Ogura et al. | |
| 2006/0192927 | A1 * | 8/2006 | Ikeuchi et al. | 353/119 |
| 2007/0114953 | A1 * | 5/2007 | Kim et al. | 315/307 |
| 2007/0146565 | A1 * | 6/2007 | Jeon et al. | 349/42 |
| 2008/0012502 | A1 * | 1/2008 | Lys | 315/247 |
| 2008/0272706 | A1 * | 11/2008 | Kwon et al. | 315/219 |

FOREIGN PATENT DOCUMENTS

| | | | |
|---|---|---|---|
| CN | 1431646 | A | 7/2003 |
| CN | 1463566 | A | 12/2003 |
| JP | S52119028 | U | 9/1977 |
| JP | H0279182 | U | 6/1990 |
| JP | 6-19315 | A | 5/1994 |
| JP | 7281155 | | 10/1995 |
| JP | 10337035 | | 12/1998 |
| JP | 11305198 | A | 11/1999 |
| JP | 2000137474 | A | 5/2000 |
| JP | 2000197368 | A | 7/2000 |
| JP | 2000304795 | A | 11/2000 |
| JP | 2001-501362 | T | 1/2001 |
| JP | 2001145347 | A | 5/2001 |
| JP | 2001228477 | A | 8/2001 |
| JP | 2002125371 | A | 4/2002 |
| JP | 2002189427 | A | 7/2002 |
| JP | 2002-244103 | A | 8/2002 |
| JP | 2002232010 | | 8/2002 |
| JP | 2002289383 | A | 10/2002 |
| JP | 2003003684 | A | 1/2003 |
| JP | 2003107424 | A | 4/2003 |
| JP | 2003153551 | A | 5/2003 |
| JP | 3096519 | U | 7/2003 |
| JP | 2003522393 | A | 7/2003 |
| JP | 2004533800 | A | 11/2004 |
| JP | 2005020992 | A | 1/2005 |
| KR | 1020030003684 | A | 1/2003 |
| KR | 101142468 | B1 | 5/2012 |
| WO | 01/58218 | A1 | 8/2001 |
| WO | 02096162 | A1 | 11/2002 |
| WO | 03/005110 | A1 | 1/2003 |

OTHER PUBLICATIONS

Office Action from Japanese Application No. 2010-188060, dated Dec. 11, 2012.
Office Action from Japanese Application No. 2010-188060, dated Apr. 9, 2013.
Office Action from Japanese Application No. 2004-145987, dated Mar. 2, 2010.
Chinese Office Action for Application No. 200480020692.0, dated Jul. 18, 2012.
Chinese Office Action for Application No. 200480020692.0, dated Mar. 1, 2013.
Chinese Office Action for Application No. 200480020692.0, dated Jun. 27, 2008.
Chinese Office Action for Application No. 200480020692.0, dated Mar. 13, 2009.
Chinese Office Action for Application No. 200480020692.0, dated Sep. 4, 2009.
Chinese Office Action for Application No. 200480020692.0, dated Oct. 27, 2010.
Chinese Office Action for Application No. 201310742982.7, dated Oct. 19, 2015.
Chinese Office Action for Application No. 201310742982.7, dated Aug. 8, 2016.
Japanese Office Action for Application No. 2010188060, dated Jul. 31, 2012.
Japanese Office Action for Application No. 2010188060, dated Mar. 8, 2013.
Japanese Office Action for Application No. 2010188060, dated Nov. 12, 2013. (Submitted with Google-generated English translation.).
Japanese Office Action for Application No. 2004145987, dated Dec. 1, 2009. (Submitted with machine-generated English translation.).
Japanese Office Action for Application No. 2004145987, dated May 25, 2010. (Submitted with machine-generated English translation.).
Japanese Office Action for Application No. 2004145987, dated Sep. 13, 2010. (Submitted with machine-generated English translation.).
Korean Office Action for Application No. 1020057024616, dated Nov. 30, 2011.
Korean Office Action for Application No. 1020057024616, dated Mar. 3, 2011.
Chinese Office Action for CN Application No. 201310742982.7, dated Oct. 19, 2015.
S. Tam et al, "Clock Generation and Distribution for the First IA-64 Microprocessor," IEEE Journal of Solid-State Circuits, vol. 35, No. 11, Nov. 2000, pp. 1545-1552.
Ted Kehl, "Hardware Self-Tuning and Circuit Performance Monitoring," In Proc. IEEE International Conference on Computer Design: VLSI in Computers and Processors, 1993, pp. 188-192.
Y. Elboim et al., "A Clock-Tuning Circuit for System-on-Chip," IEEE Transactions on Very Large Scale Integration (VLSI) Systems, vol. 11, No. 4, Aug. 2003, pp. 616-626.
N. Tiwari et al., "Skew Generation and Analysis in Timing-Critical Circuits," EDN (www.edn.com), Nov. 13, 2003, pp. 87-96.

(56) References Cited

OTHER PUBLICATIONS

K. Rahimi et al., "In-Circuit Self-Tuning of Clock Latencies," Proceedings of the Sixth International Symposium on Quality Electronic Design (ISQED '05), 2005, 6 pages.
S. Tam et al., "Clock Generation and Distribution for the 130-nm Itanium 2 Processor with 6-MB On-Die L3 Cache", IEEE Journal of Solid-State Circuits, vol. 39, No. 4, Apr. 2004, pp. 636-642.

* cited by examiner

1

AMENDED

AMENDED
FIG. 7
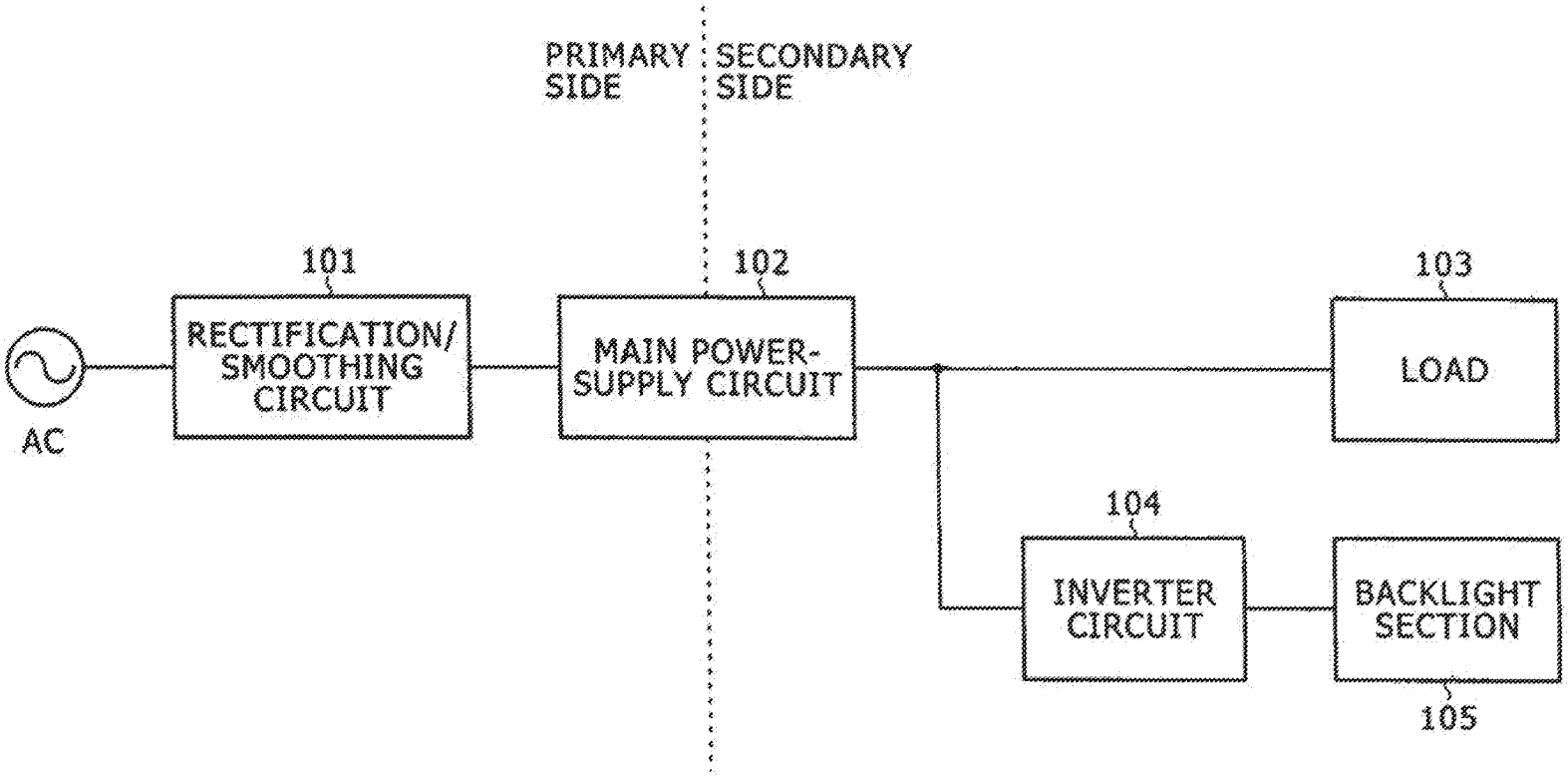
PRIOR ART

AMENDED
FIG. 8
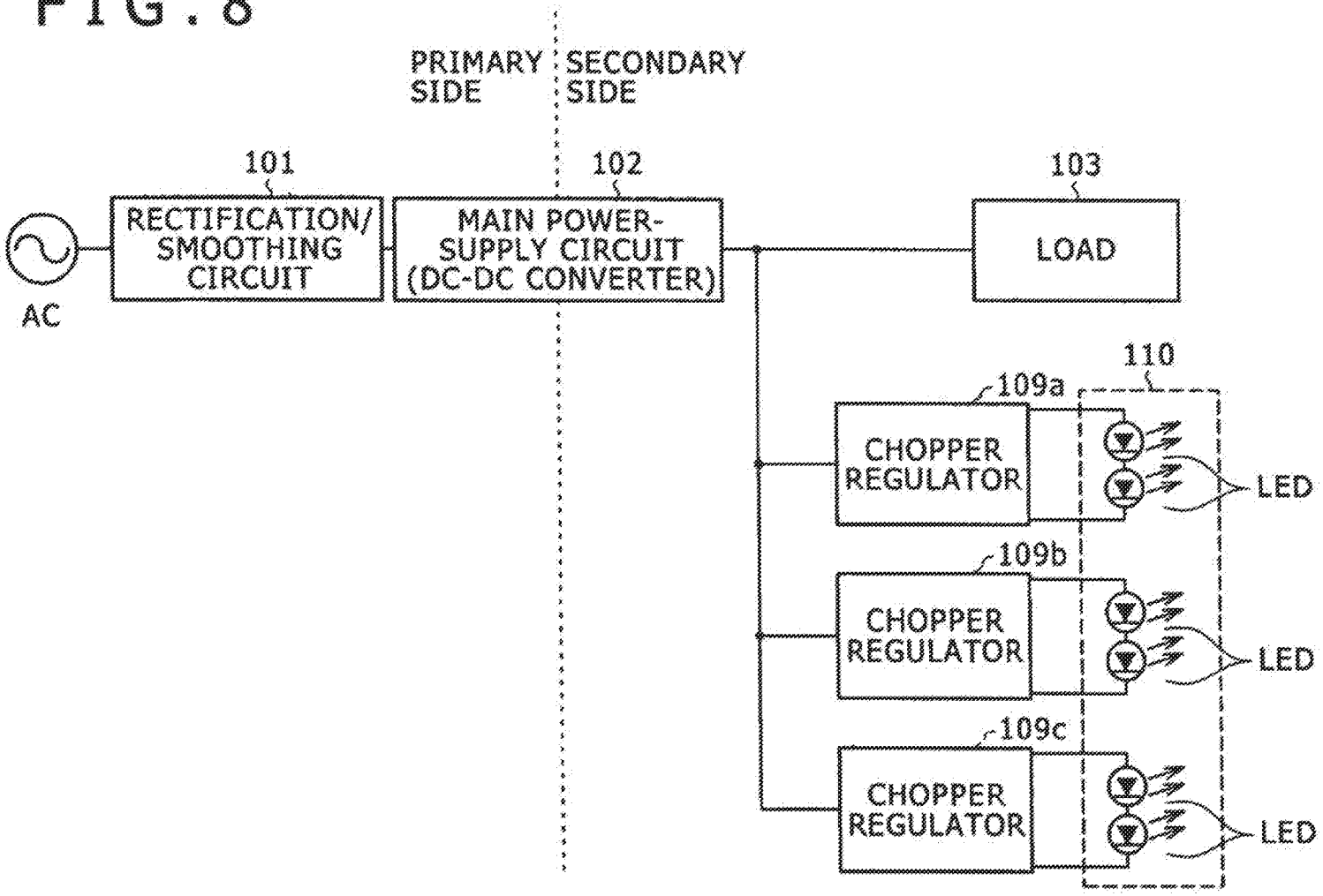
PRIOR ART

POWER SUPPLY APPARATUS AND DISPLAY APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*The present application is a reissue application of U.S. Pat. No. 7,764,022, issued on Jul. 27, 1010, which is a national phase entry under 35 U.S.C. § 371 of International Publication No. WO 2005/112245, published Nov. 24, 2005, which claims the priority from Japanese Application No. P2004-145987, filed May 17, 2004, all of which are hereby incorporated herein by reference; more than one reissue application has been filed for the reissue of U.S. Pat. No. 7,764,022; the reissue applications are U.S. application Ser. No. 13/560,215 filed on Jul. 27, 2012 and U.S. application Ser. No. 14/989,388 filed on Jan. 16, 2016.*

TECHNICAL FIELD

The present invention relates to a power-supply apparatus for generating a direct current power-supply voltage to be supplied to a display apparatus and a predetermined load of the display apparatus as well as generating a power-supply voltage to be supplied to a backlight section of the display apparatus.

BACKGROUND ART

In a display apparatus of a non-self emitting type, a backlight section is employed as a light source for displaying a picture. An example of the display apparatus of a non-self emitting type is a liquid crystal display apparatus.

The backlight section of such a liquid crystal display apparatus can be a cold cathode fluorescent tube or an LED (Light Emitting Diode).

In the case of a cold cathode fluorescent tube employed as a backlight section, a power-supply section of the display apparatus includes an inverter circuit for generating an alternative current voltage used for driving the backlight section.

As shown in FIG. 7, typically, such an inverter circuit inputs a direct current power supplied by a main power-supply circuit employed in a liquid crystal display apparatus, and generates an alternative current voltage.

In the liquid crystal display apparatus shown in the figure, first of all, a rectification/smoothing circuit 101 inputs a commercial alternative current power-supply AC and generates a direct current voltage. Then, a DC-DC converter connected to the rear stage of the rectification/smoothing circuit 101 to serve as a main power-supply circuit 102 carries out a DC-DC power conversion process on the direct current voltage generated by the rectification/smoothing circuit 101 to generate a direct current power-supply voltage at a stabilized predetermined level. Typically, the main power-supply circuit 102 employs an isolation transformer serving as a direct current isolator between the primary and secondary sides. That is to say, the primary side, which is the commercial alternative current power-supply side, inputs a direct current voltage whereas the secondary side outputs a direct current power-supply voltage.

As shown in the figure, the direct current power-supply voltage output by the secondary side of the main power-supply circuit 102 is supplied to a load 103, which is driven by the direct current power-supply voltage to operate. In addition, also as shown in the figure, the direct current power-supply voltage output by the secondary side of the main power-supply circuit 102 branches, being supplied to an inverter circuit 104.

The inverter circuit 104 carries out a DC-AC power conversion process on the received direct current power-supply voltage to generate an alternative current voltage, which is supplied to a backlight section 105. The backlight section 105 is driven by the alternative current voltage to emit light.

In this case, the main power-supply circuit 102 is provided with a switching converter on the primary side and a rectification/smoothing circuit on the secondary side. In this configuration, a switching output obtained on the primary side is rectified and smoothed on the secondary side to generate a direct current voltage serving as the power-supply voltage. Thus, as shown in the figure, the inverter circuit 104 receives the direct current power-supply generated by the secondary side of the main power-supply circuit 102.

Then, as described above, the inverter circuit 104 carries out a DC-AC power conversion process on the received direct current power-supply to generate an alternative current voltage, which is supplied to the backlight section 105 as a driving voltage.

On the other hand, FIG. 8 is a diagram showing the configuration of a liquid crystal display apparatus having a backlight section composed of LEDs. It is to be noted that sections shown in FIG. 8 as sections identical with their respective counterparts explained earlier by referring to FIG. 7 are denoted by the same reference numerals as the counterparts.

In the case of a backlight section 110 composed of LEDs as shown in the figure, chopper regulators 109 are provided on the secondary side as a circuit for driving the backlight section 110. In the case of the typical configuration shown in FIG. 8, a plurality of chopper regulators 109a, 109b and 109c are connected in parallel to each other to a plurality of LEDs, which form the backlight section 110.

To be more specific, the chopper regulators 109a, 109b and 109c are each connected to a circuit including a plurality of LEDs connected to each other in series. The chopper regulators 109 receive a direct current voltage from the secondary side of the main power-supply circuit 102 and carries out a DC-DC power conversion process on the direct current voltage. Then, a direct current voltage obtained as a result of the DC-DC power conversion process is stabilized in a voltage stabilization process according to a result of detecting the level of a current flowing through each of the LEDs. The stabilized voltage is applied to the LEDs as a driving voltage to emit light from each of the LEDs.

The chopper regulators 109 are connected in parallel to each other in this configuration to keep up with, for example, a case in which the number of LEDS is relatively large to form a big-size screen of the liquid crystal display apparatus and a case requiring a relatively high level as a direct current level for producing necessary high luminance. That is to say, if only one chopper regulator 109 is used for driving a plurality of LED series connection circuits in a configuration including a large number of LEDs to be driven and a configuration requiring a large current as described above, the size of the circuit of the single chopper regulator 109 itself is big and, in order to solve this problem, a plurality of chopper regulators 109 is connected in parallel to each other.

If a backlight section 110 including LEDs as described above is used, the chopper regulators 109 receive a direct current voltage from the main power-supply circuit 102 and carries out a DC-DC power conversion process on the direct current voltage. Then, a direct current voltage obtained as a result of the DC-DC power conversion process is used as a direct current power-supply of the backlight section 110.

It is to be noted that Japanese Patent Laid-open No. Hei 2-79182 discloses a technology relating to an inverter circuit provided for a case in which a fluorescent tube is used as a light source of a display apparatus.

In addition, Japanese Patent Laid-open No. 2002-244103 discloses a technology relating to a chopper regulator provided for a case in which LEDs are used as a light source.

By the way, as shown in FIG. 7 previously, the inverter circuit 104 is provided at the stage behind the main power-supply circuit 102. Thus, a power supplied to the inverter circuit 104 is a result of a power conversion process carried out in the main power-supply circuit 102. Then, in order to generate an alternative current voltage for driving the backlight section 105, the inverter circuit 104 again carries out a power conversion process.

That is to say, in the conventional configuration shown in FIG. 7, in order to drive the backlight section 105, two power conversion processes are carried out in the main power-supply circuit 102 and the inverter circuit 104 respectively.

Also in the case of the configuration shown in FIG. 8, in order to drive the backlight section 110, two DC-DC power conversion processes are carried out in the main power-supply circuit 102 and the chopper regulator 109 respectively.

By carrying out a plurality of power conversion processes as described above, the power conversion efficiency decreases, raising the power loss.

Particularly, in recent years, a technological revolution in the liquid crystal display field increases the size of the display screen increasing thereby the power consumption for driving the backlight so that the power consumption of the set as a whole rises. For a screen size of 40 inches, for example, the power consumption of the set as a whole is about 250 W for some cases. In the case of display apparatus manufactured in recent years as apparatus with large screens, the power loss reaches a relatively high level.

In addition, in such cases, with the display screen increased and the power consumptions of the inverter circuit 104 and the chopper regulator 109 rising, in consequence, it is necessary to keep up with the large power of the main power-supply circuit 102. That is to say, since the inverter circuit 104 and the chopper regulator 109 are provided at the stages behind the main power-supply circuit 102, as the power consumptions of the inverter circuit 104 and the chopper regulator 109 increase, the power of the main power-supply circuit 102 also rises by an increase that should be kept up with.

Thus, in the conventional configurations shown in FIGS. 7 and 8, as the size of the display screen increases, the size of the main power-supply circuit 102 also rises so that the cost to manufacture the circuit of the main power-supply circuit 102 becomes higher as well.

In addition, by letting the large power of the main power-supply circuit 102 be kept up with as described above, the amount of heat dissipated due to an actual power loss increases. In order to keep up with the increasing amount of dissipated heat, it is necessary to reserve a space large enough to serve as a countermeasure of the dissipated heat or to set a countermeasure by providing a cooling fan.

If a space is provided as a countermeasure of dissipated heat, however, the space certainly entails a large size of the apparatus. In addition, if a cooling fan is provided, the operation sound of the fan will serve as a source of discomfort suffered by the user.

DISCLOSURE OF INVENTION

In order to solve the problems described above, the present invention provides a power-supply apparatus having the following configuration.

In the first place, the power-supply apparatus has:

an input voltage generation section for generating a direct current input voltage from an input alternative current voltage; and a first power conversion section including a primary side for receiving the direct current input voltage as well as a secondary side isolated from the primary side and used for generating a direct current power-supply voltage to be supplied to a predetermined load as a result of a DC-DC power conversion process carried out.

In the second place, the power-supply apparatus includes a second power conversion section including a primary side for receiving the direct current input voltage as well as a secondary side isolated from the primary side and used for generating an alternative current voltage to be supplied to a backlight section as a result of a power conversion process based on DC-AC conversion of the direct current input voltage.

In addition, the power-supply apparatus further includes a display section for displaying a picture by using the backlight section.

In accordance with the above configuration of the present invention, the second power conversion section operates by directly inputting the direct current input voltage generated by the input-voltage generation section instead of inputting the direct current output voltage generated by the first power conversion means.

That is to say, the present invention does not adopt a circuit configuration in which a power conversion process is carried out a plurality of times.

As described above, in accordance with the present invention, the configuration for generating a voltage used for driving the backlight section of the display apparatus does not include a circuit for carrying out a power conversion process a plurality of times. Thus, the power loss of the power-supply apparatus can be reduced to a value smaller than the conventional configuration.

In addition, in accordance with the present invention, the first power conversion section and the second power conversion section are not connected to each other in series. Instead, they are connected to each other to form a parallel circuit receiving the direct current input voltage. Thus, the power to be consumed by the first power conversion section is independent of the power consumption of the second power conversion section. As a result, even if the power consumption in a load connected to the second power conversion section rises, it is no longer necessary to increase the capacity of the first power conversion section.

BRIEF DESCRIPTION OF DRAWINGS

FIG. 7 is a block diagram showing a simplified configuration of a power-supply apparatus employed in the conventional liquid crystal display apparatus employing a backlight section based on fluorescent tubes; and FIG. 8 is a block diagram showing a simplified configuration of a power-supply apparatus employed in the conventional liquid crystal display apparatus employing a backlight section based on LEDs.

BEST MODE FOR CARRYING OUT THE INVENTION

Preferred embodiments implementing the present invention are described below. In the following description, the preferred embodiments are each referred to simply as an embodiment.

Figure 1:
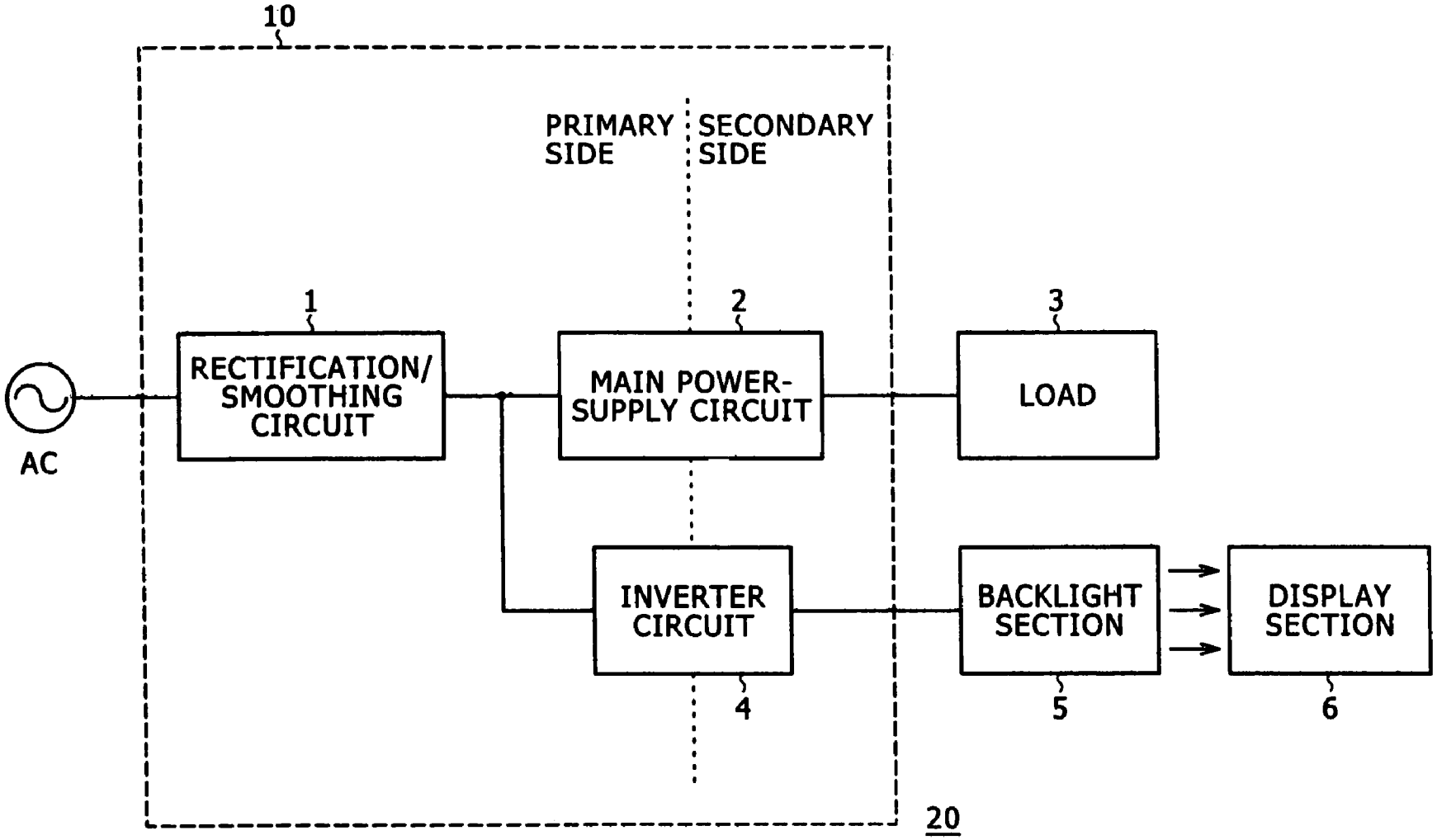
FIG. 1 is a diagram showing a simplified configuration of a power-supply apparatus employed in a liquid crystal display apparatus according to a first embodiment of the present invention.

FIG. 1 is a block diagram showing a configuration including a simplified configuration of a power-supply apparatus 10 serving as a power supply supplying power to a display apparatus 20, for example, which is a liquid crystal display apparatus according to a first embodiment.

First of all, the power-supply apparatus 10 according to the embodiment functions as a power-supply section of a liquid crystal display apparatus. Power-supply voltages generated by the power-supply apparatus 10 are supplied to a load 3 corresponding to a variety of circuits each driven to operate by a direct current power supply and a backlight section 5 driven by an alternative current voltage. The backlight section 5 radiates light to a panel back face of a liquid crystal display unit functioning as a display section 6, causing the liquid crystal display section to display a picture.

In the configuration shown in FIG. 1, a rectification/smoothing section 1 rectifies and smoothes an input commercial alternative current power-supply AC to generate a direct current input voltage Ei.

Figure 2:
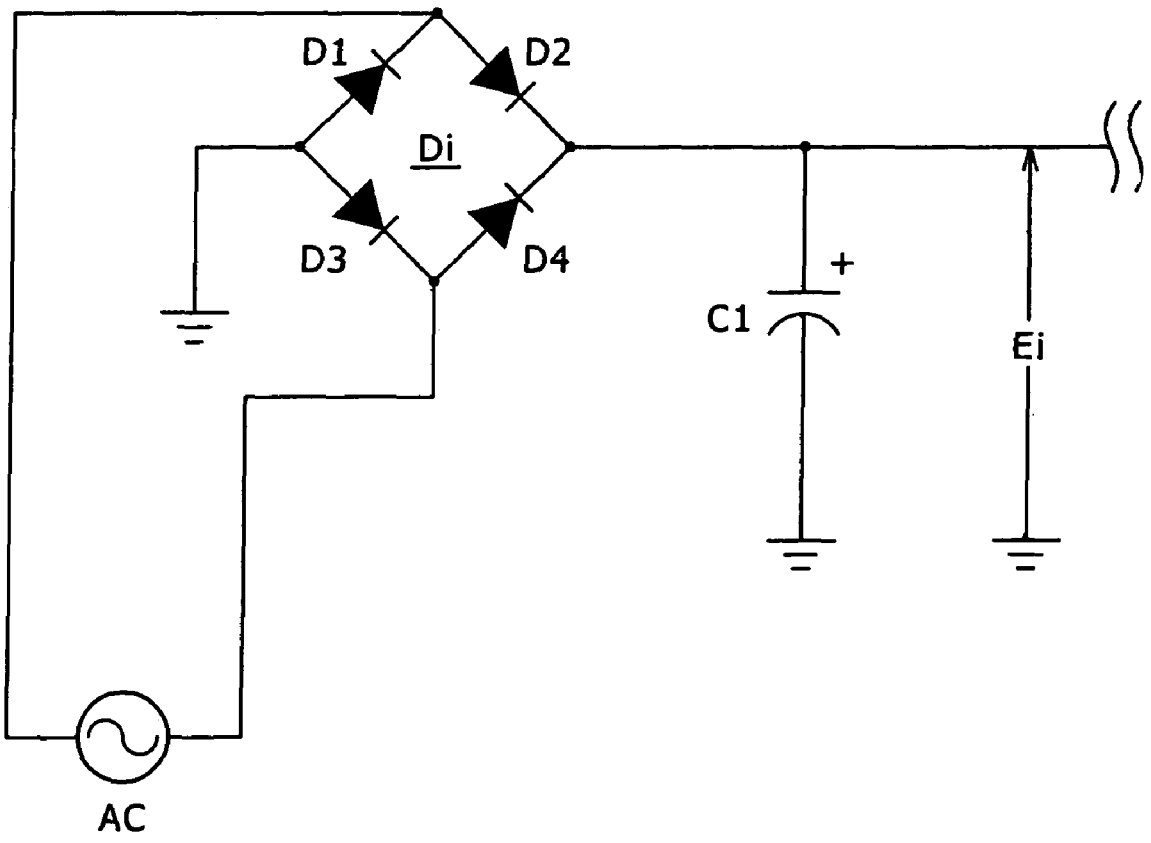
FIG. 2 is a circuit diagram showing a typical configuration of a rectification/smoothing circuit employed in the power-supply apparatus according to the first embodiment.

The rectification/smoothing section 1 has a typical configuration shown in FIG. 2. The configuration shown in FIG. 2 includes a bridge rectification circuit Di and a smoothing capacitor C1. The bridge rectification circuit Di has 4 rectification diodes D1 to D4. The smoothing capacitor C1 is a capacitor for smoothing a rectified output generated by the bridge rectification circuit Di.

As shown in the figure, a plus input terminal of the bridge rectification circuit Di is connected to a plus line of the commercial alternative current power-supply AC. On the other hand, a plus output terminal of the bridge rectification circuit Di is connected to the plus terminal of the smoothing capacitor C1. The minus terminal of the smoothing capacitor C1 is connected to the earth of the primary side. A minus input terminal of the bridge rectification circuit Di is also connected to the earth of the primary side. A minus output terminal of the bridge rectification circuit Di is connected to a minus line of the commercial alternative current power-supply AC.

In the rectification/smoothing section 1 having the configuration described above, during a half-cycle period of a positive polarity of the input voltage of the commercial alternative current power-supply AC, the rectification diodes D1 and D3 are in an electrically conductive state, electrically charging their rectified output into the smoothing capacitor C1. During a half-cycle period of a negative polarity of the input voltage of the commercial alternative current power-supply AC, on the other hand, the rectification diodes D2 and D4 are in an electrically conductive state, electrically charging their rectified output into the smoothing capacitor C1.

That is to say, rectified outputs are electrically charged into the smoothing capacitor C1 during both the half-cycle period of the positive polarity and the half-cycle period of the negative polarity of the input voltage of the commercial alternative current power-supply AC to carry out rectification and smoothing operations based on full-wave rectification. As a result of such rectification and smoothing operations, a direct current input voltage Ei is obtained at the terminals of the smoothing capacitor C1 at a direct current level equal to the amplitude of the commercial alternative current power-supply AC. This configuration can be said to be a configuration for generating the direct current input voltage Ei by adoption of the so-called capacitor input method.

It is to be noted that the configuration of the rectification/smoothing section 1 is not limited to the one shown in FIG. 2. That is to say, another configuration can also be adopted as a configuration for implementing the capacitor input method. For example, the configuration can be implemented as a multiplied-voltage rectification/smoothing circuit.

In the case of this embodiment, a main power-supply circuit 2 and an inverter circuit 4 are connected in parallel to the rectification/smoothing section 1 as shown in FIG. 1.

The main power-supply circuit 2 includes an isolation transformer between the side of the commercial alternative current power-supply AC and the side of the load 3. The main power-supply circuit 2 adopts the configuration of the so-called switching converter including a switching device on the primary side of the isolation transformer and a rectification/smoothing circuit on the secondary side of the isolation transformer. The switching device employed in the main power-supply circuit 2 serving as the switching converter switches the direct current input voltage Ei received from the rectification/smoothing section 1. A result of the switching operation excites an output on the secondary side of the isolation transformer. The rectification/smoothing circuit on the secondary side of the isolation transformer then rectifies and smoothes the output excited on the secondary side of the isolation transformer to generate a direct current voltage, which is supplied to the load 3 shown in the figure as an operating power-supply (a direct current power-supply voltage).

The inverter circuit 4 also receives the direct current input voltage from the rectification/smoothing section 1 to generate an alternative current voltage for driving the backlight section 5.

To put it in detail, the inverter circuit 4 has the following configuration. Not isolated from the commercial alternative current power-supply AC in a direct current isolation way, the primary side of the inverter circuit 4 receives the direct current input voltage Ei generated by the rectification/smoothing section 1. The direct current input voltage Ei received by the primary side of the inverter circuit 4 in this way is then subjected to a DC→AC power conversion process to generate an alternative current voltage on the secondary side, which is isolated from the commercial alternative current power-supply AC in a direct current isolation way.

Figure 3:
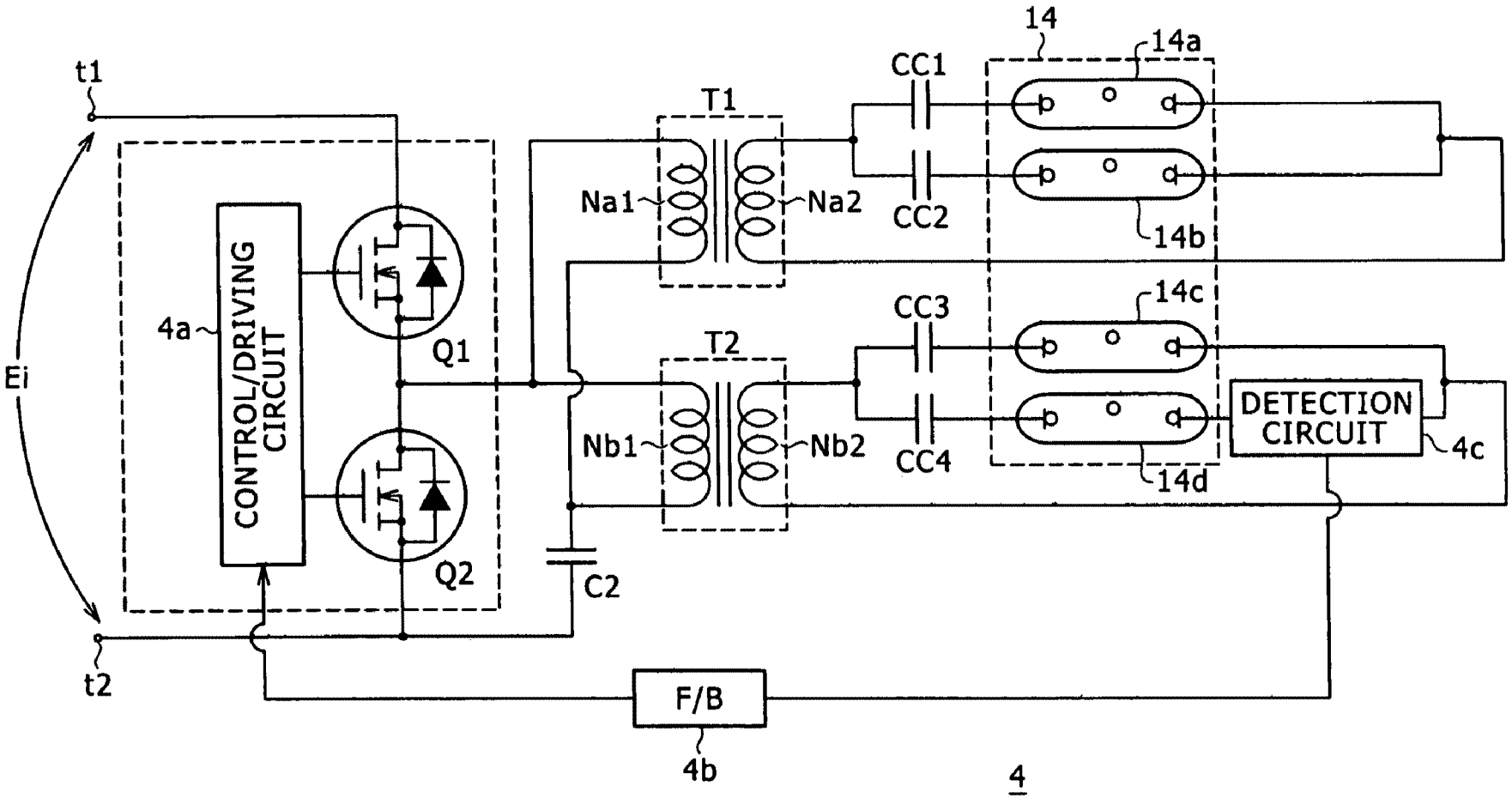
FIG. 3 is a circuit diagram showing the configuration of an inverter employed in the power-supply apparatus according to the first embodiment.

A typical internal configuration of the inverter circuit 4 is shown in FIG. 3.

The configuration shown in FIG. 3 is a separate excitation configuration in which switching devices Q1 and Q2 are driven in accordance with control of a control/driving circuit 4a, which is shown in the figure, to generate an alternative current voltage for driving the backlight section 5. The backlight section 5 driven by the inverter circuit 4 typically includes 4 fluorescent tubes 14, which are denoted by reference numerals 14a to 14d respectively as shown in the figure.

First of all, the direct current input voltage Ei generated by the rectification/smoothing section 1 shown in FIG. 1 is applied between terminals t1 and t2 of the configuration shown in FIG. 3.

The terminal t1 is connected to the drain of a MOS-FET serving as the switching device Q1. The source of the switching device Q1 is connected to the drain of another MOS-FET serving as the switching device Q2.

The source of the switching device Q2 is connected to the terminal t2.

The gates of the switching devices Q1 and Q2 receives control signals from the control/driving circuit 4a.

The control/driving circuit 4a is a programmed IC (Integrated Circuit) for executing control to turn on and off the switching devices Q1 and Q2 alternately.

The junction point between the source of the switching device Q1 and the switching output point of the switching device Q2 is connected to a terminal of a primary winding Na1 of a transformer T1 shown in the figure and a terminal of a primary winding Nb1 of a transformer T2, respectively. The other terminal of the primary winding Na1 is connected to the terminal t2 through a capacitor C2. In the same way, the other terminal of the primary winding Nb1 is also connected to the terminal t2 also through the capacitor C2.

In this configuration, the primary winding Na1 of the transformer T1 and the primary winding Nb1 of the transformer T2 are both not isolated from the commercial alternative current power-supply AC. That is to say, in this configuration, as is obvious from the fact that the direct current input voltage Ei is applied between terminals t1 and t2, the front stage starting with the primary windings Na1 and Nb1 employed in the inverter circuit 4 exists on the primary side not isolated from the commercial alternative current power-supply AC in a direct current isolation manner.

Thus, with the inverter circuit 4 having the configuration described above, the backlight section 5 provided at the rear stage serves as a load on the secondary side isolated from the primary side in a direct current isolation manner by the transformers T1 and T2 for assuring the direct current isolation state. Thus, it is necessary to preserve an enough direct current isolation state between the primary and secondary states by, for example, allocating a sufficient gap between the primary winding Na1 and secondary winding Na2 of the transformer T1 as well as a sufficient gap between the primary winding Nb1 and secondary winding Nb2 of the transformer T2 in the transformers T1 and T2 respectively.

As shown in the figure, one terminal of the secondary winding Na2 of the transformer T1 is connected to capacitors CC1 and CC2 forming a parallel circuit with respect to the terminal as a circuit for limiting a current flowing through the secondary winding Na2. The capacitor CC1 is connected to one terminal of the fluorescent tube 14a and the capacitor CC2 is connected to one terminal of the fluorescent tube 14b.

The other terminal of the fluorescent tube 14a and the other terminal of the fluorescent tube 14b are connected to the other terminal of the secondary winding Na2.

By the same token, as shown in the figure, one terminal of the secondary winding Nb2 of the transformer T2 is connected to capacitors CC3 and CC4 forming a parallel circuit. The capacitor CC3 is connected to one terminal of the fluorescent tube 14c and the capacitor CC4 is connected to one terminal of the fluorescent tube 14d. The other terminal of the fluorescent tube 14c and the other terminal of the fluorescent tube 14d are connected to the other terminal of the secondary winding Nb2.

A feedback circuit 4b receives a tube voltage detected by a detection circuit 4c shown in the figure as a voltage of the fluorescent tube 14d and rectifies the peaks of the voltage. Then, the feedback circuit 4b supplies a voltage obtained as a result of rectification to the control/driving circuit 4a. On the basis of this voltage representing an adjusted optical signal, the control/driving circuit 4a controls the quantity of light emitted by the fluorescent tubes 14a to 14d to a constant value.

It is to be noted that the feedback circuit 4b isolates the primary and secondary sides from each other for example by using a photo coupler.

In the inverter circuit 4 having the configuration described above, the direct current input voltage Ei applied between the terminals t1 and t2 is switched on and off by the switching devices Q1 and Q2, which turn on and off alternately in accordance with control executed by the control/driving circuit 4. A voltage output as a result of the switching operations is supplied to the primary windings Na1 and Nb1 employed in the transformers T1 and T2 respectively.

By supplying the switching output to the primary windings Na1 and Nb1 as described above, alternative current voltages are excited along the secondary windings Na2 and Nb2 at a high level according to the winding ratio of the primary windings Na1 and Nb1. The alternative current voltages excited along the secondary windings Na2 and Nb2 cause currents to flow through the fluorescent tubes 14a to 14d. As a result, light is emitted from each of the fluorescent tubes 14a to 14d.

It is to be noted that, while the inverter circuit 4 adopts the separate excitation method, a self-excitation technique can also be taken.

As described above, in the first embodiment, the main power-supply circuit 2 and the inverter circuit 4 are connected in parallel to each other to the rectification/smoothing section 1. Thus, in such a configuration, an alternative current voltage for driving the backlight section 5 can be obtained not through the main power-supply circuit 2. As a result, the main power-supply circuit 2 does not incur a power loss due to generation of the alternative current voltage for driving the backlight section 5.

In addition, since the alternative current voltage for driving the backlight section 5 can be obtained by carrying out a power conversion process only once in the inverter circuit 4, the power loss incurred in the power-supply apparatus can be reduced to a small value in comparison with the conventional configuration shown in FIG. 7.

The reduction of the power loss is explained in terms of expressions as follows.

First of all, let us assume that notation $\eta 1$ denotes the power conversion efficiency of the main power-supply circuit, notation $\eta 2$ denotes the power conversion efficiency of the inverter circuit, notation P1 denotes the load power of all loads other than the backlight section 5 and notation P2 denotes the load power of the backlight section 5. In this case, the input power of the conventional configuration shown in FIG. 7 is expressed as follows:

$$(1/\eta 1)P1+(1/\eta 1\eta 2)P2$$

Figure 6:
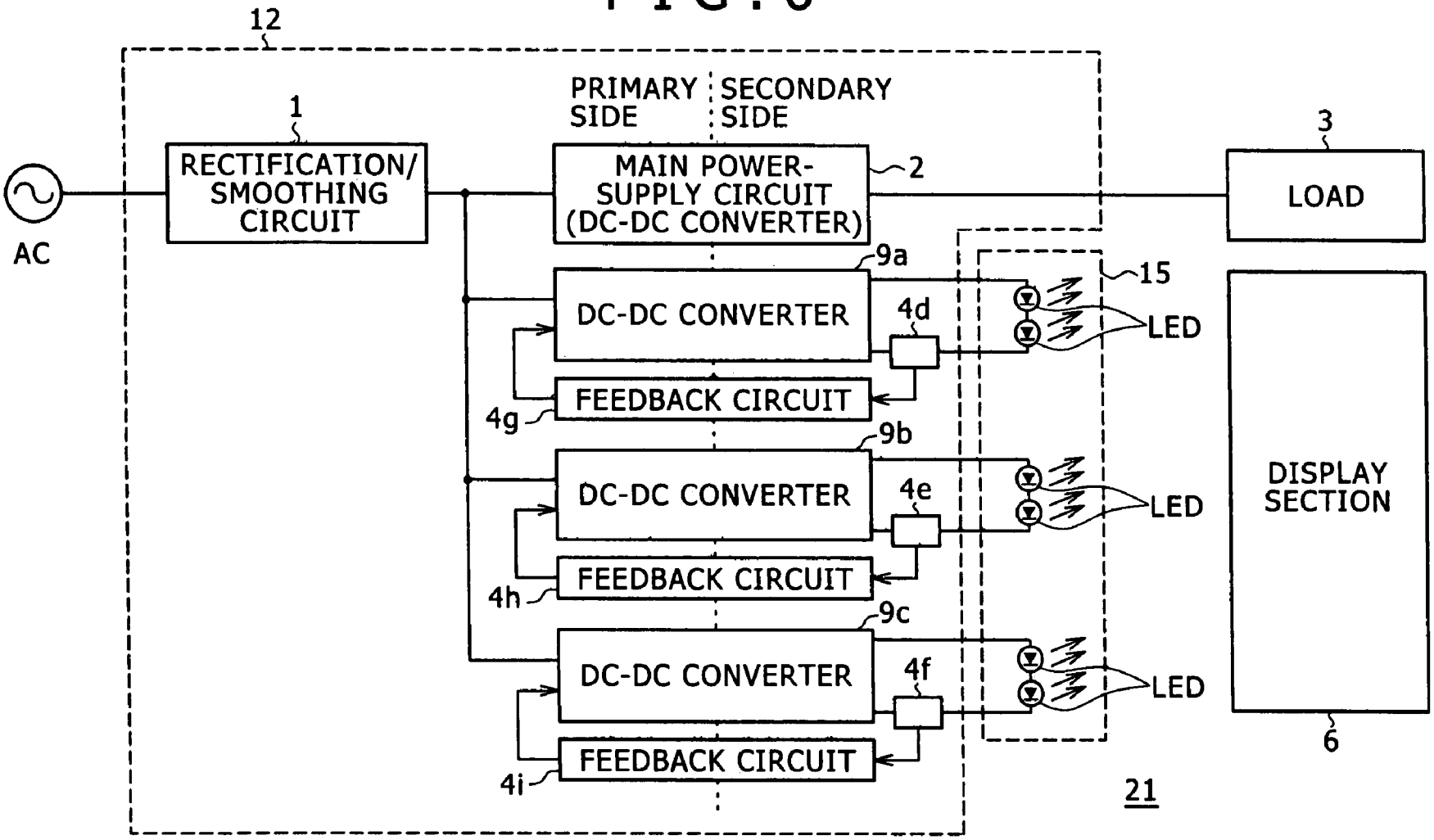
FIG. 6 is a circuit diagram showing a configuration of a power-supply apparatus employed in a liquid crystal display apparatus according to a second embodiment of the present invention.

On the other hand, the input power of the configuration according to the embodiment shown in FIG. 1 is expressed as follows:

$$(1/\eta 1)P1+(1/\eta 2)P2$$

where the quantities of notation $\eta 1$ denoting the power conversion efficiency of the main power-supply circuit 2 and notation $\eta 2$ denoting the power conversion efficiency of the inverter circuit are the same as those in the configuration shown in FIG. 6.

That is to say, in the configuration including an inverter circuit provided at the stage behind the main power-supply circuit as shown in FIG. 7, the power conversion efficiency along a path for obtaining the alternative current voltage at the output of the inverter circuit is a product of the power conversion efficiency of the main power-supply circuit and the power conversion efficiency of the inverter circuit. Thus, the power conversion efficiency along the path decreases substantially due to the multiplication.

In the case of the embodiment, on the other hand, the power conversion efficiency along the path for obtaining the alternative current voltage is dependent only on the inverter circuit. Thus, the power conversion efficiency can be maintained at a value higher than that of the conventional power-supply circuit shown in FIG. 7. That is to say, the power loss is small in comparison with the conventional power-supply circuit.

Since the power conversion efficiency along a path for obtaining the alternative current voltage used for driving the backlight section can be maintained at a value higher than that of the conventional power-supply circuit, the power loss caused by an increased load power P2 of the backlight section due to an increased size of the display screen for example can be suppressed to a quantity smaller than that of the conventional power-supply apparatus.

That is to say, in this case, the difference in input power between the configuration shown in FIG. 7 and the power-supply apparatus 10 according to the embodiment is expressed as follows:

$$(1/\eta 1\eta 2-1)P2$$

As is obvious from the above expression, the greater the load power P2 of the backlight section, the larger the difference in input power between the conventional configuration and the power-supply apparatus 10 according to the embodiment.

It is thus clear that, with the power-supply apparatus 10 according to the embodiment, the larger the size of the screen display and, hence, the larger the power consumption of the inverter circuit 4, the greater the power-loss reduction effect as compared with the conventional configuration.

In addition, as described above, since an alternative current voltage for driving the backlight section 5 can be obtained not through the main power-supply circuit 2, it is no longer necessary to keep up with a rising power of the main power-supply circuit 2 even if the size of the display screen is increased. Thus, the amount of heat dissipated in the main power-supply circuit 2 due to an increased display screen in size does not rise. As a result, it is no longer necessary to allocate a sufficient space as a countermeasure to cope with dissipated heat as is the case with the conventional power-supply apparatus. Accordingly, the downsizing of the display apparatus is possible.

In addition, it is no longer necessary to provide a cooling fan for coping with dissipated heat. It is thus possible to get rid of the operation sound of the fan as a source of discomfort suffered by the user.

On top of that, since the main power-supply circuit 2 no longer needs to supply power to the backlight section 5, power-supply specifications of the main power-supply circuit 2 need to be dependent on only conditions of the load 3. Thus, the design of the main power-supply circuit 2 can be standardized with ease.

In the case of the conventional configuration shown in FIG. 7, on the other hand, the power-supply specifications of the main power-supply circuit 2 are dependent also on, among others, the type of the backlight section 105 (the type of the display panel). This is because the power-supply specifications of the main power-supply circuit 2 are dependent on specifications of the inverter circuit and the specifications of the inverter circuit need to be modified in accordance with the type of the backlight section 105 (the type of the display panel). Thus, the design of the main power-supply circuit 2 can not be standardized with ease.

In the conventional configuration, the main power-supply circuit and the inverter circuit cannot be connected to form a parallel circuit as is the case with the embodiment described above due to the following reasons.

In the field of the conventional liquid crystal display apparatus, display apparatus having a small screen with a size in the range 15 to 17 inches are the majority. Thus, the power consumption of the inverter circuit is relatively small. Accordingly, in the case of the conventional configuration, the power loss incurred in a process of generating an alternative current voltage for driving the backlight section can be suppressed to a comparatively low level. For these reasons, the conventional configuration including an unisolated inverter inputting power from the main power-supply circuit is rather preferred to offer merits due to the fact that that this configuration does not raise problems of an increasing cost and a rising circuit space.

The idea of the present invention has been adopted because, in the first place, the screen of the liquid crystal display apparatus has been increasing in recent years, causing the power consumption of the backlight section to rise.

That is to say, in recent years, display apparatus typically having a screen size in the 40-inch class have been becoming popular. However, some of the display apparatus with a screen size in the 40-inch class have a backlight section inverter with a power consumption of about 200 W. If a backlight section inverter has a large power consumption as described above, the magnitude of a power loss incurred in every power conversion process also increases to a relatively large value if the display apparatus employing the backlight section inverter is designed into the conventional configuration. Thus, the conventional configuration raises a large number of problems.

The idea of the present invention is adopted as a technology for solving the problems. By applying the present invention to liquid crystal display apparatus as described above, a power-loss reduction effect can be obtained and, the larger the size of the display screen, the greater the power-loss reduction effect. Thus, in keeping up with future environment changes such as increases in display-screen size, the importance of the present invention is considered to increase.

Next, the configurations of power-supply apparatus each serving as a modified version of the first embodiment are explained.

Figure 4:
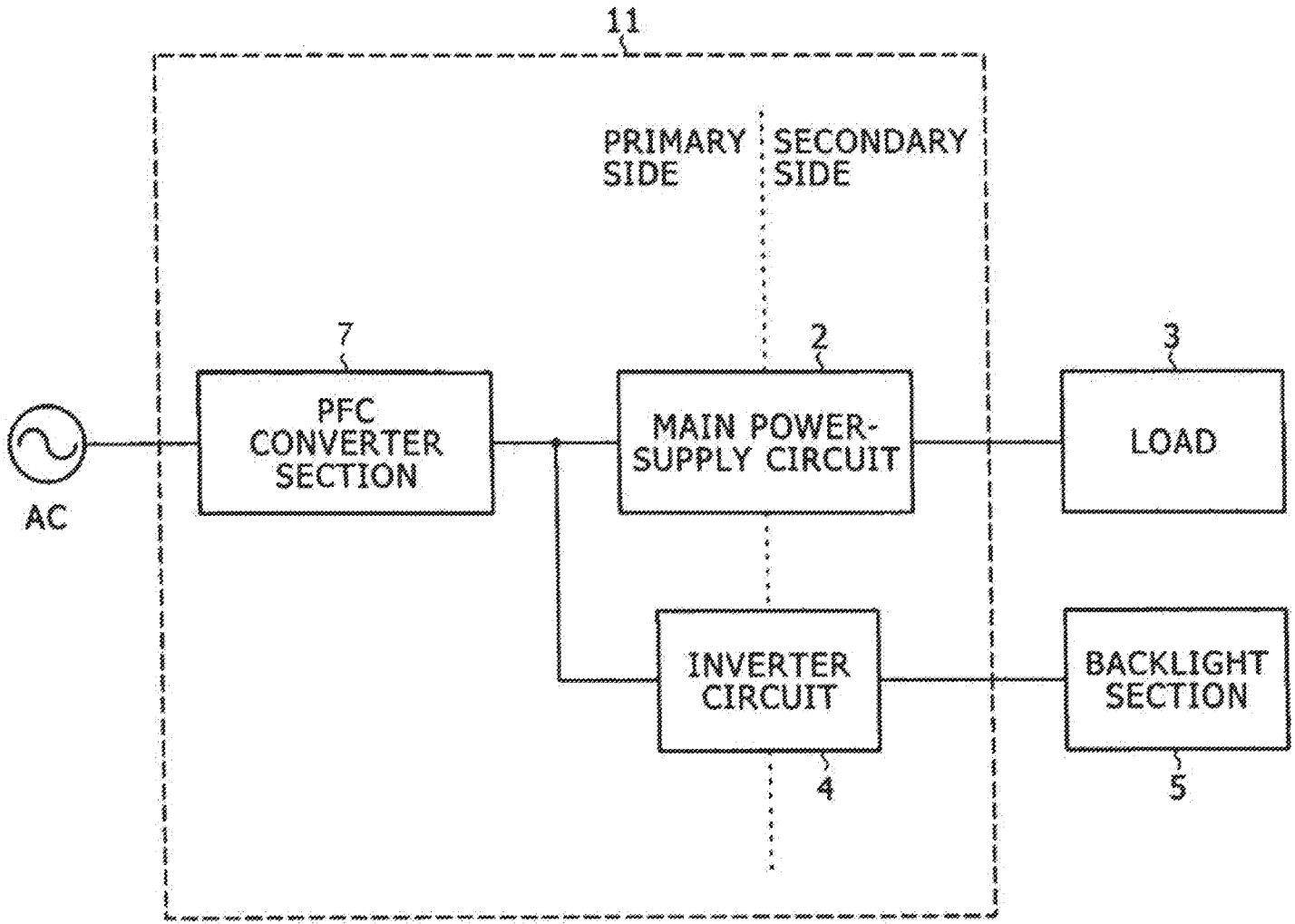
FIG. 4 is a circuit diagram showing another simplified configuration of the power-supply apparatus according to the first embodiment.

FIG. 4 is a block diagram showing another simplified configuration of the power-supply apparatus 11 according to the first embodiment.

In the power-supply apparatus 11, a PFC (Power Factor Correction) converter circuit 7 is employed as a substitute for the rectification/smoothing section 1 shown in FIG. 1. That is to say, as one of countermeasures for eliminating power-supply harmonic distortions, for example, a converter for improving the power factor is provided at a stage preceding the main power-supply circuit. Thus, the power-supply apparatus 11 includes the PFC converter circuit 7 at a stage in front of the main power-supply circuit 2 as well as in front of the inverter circuit 4.

Figure 5:
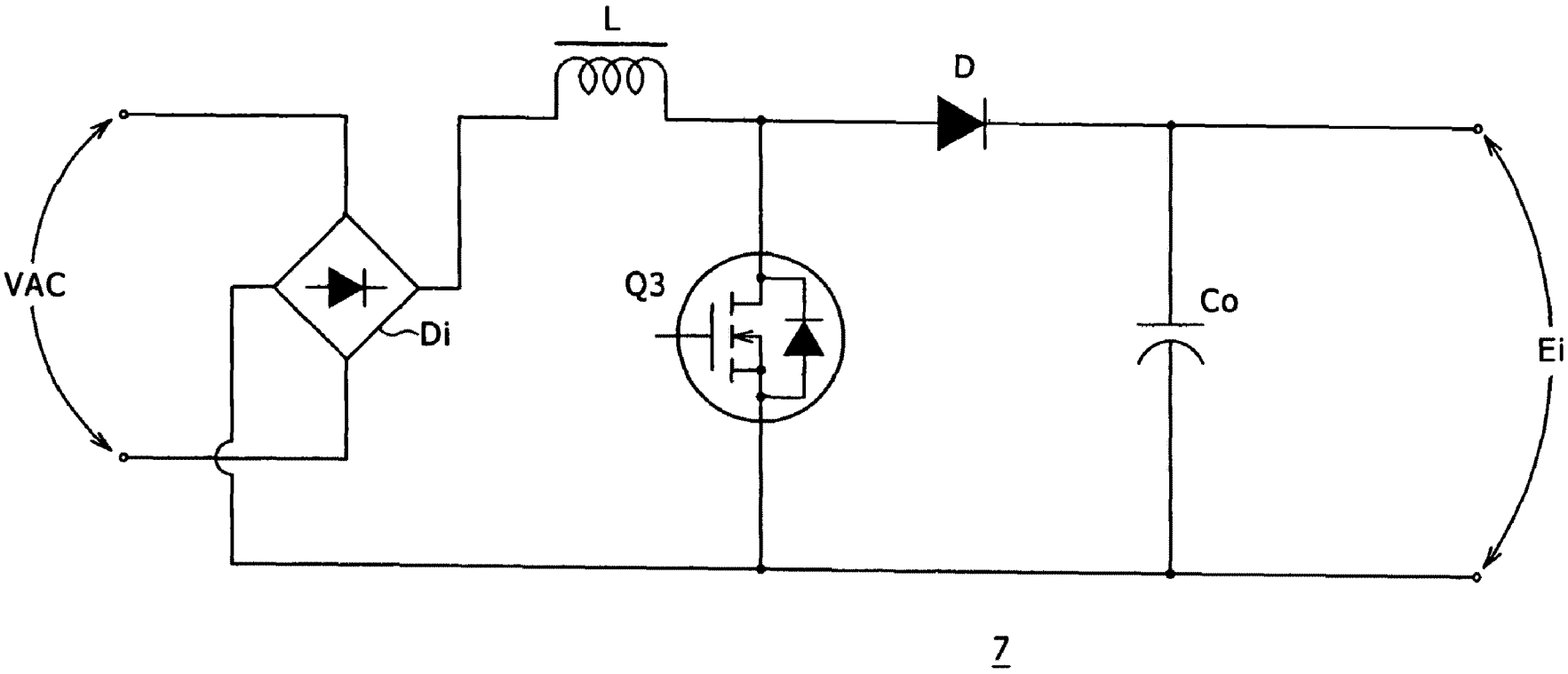
FIG. 5 is a circuit diagram showing a typical configuration of a PFC converter circuit employed in the power-supply apparatus according to the first embodiment.

A typical configuration of the PFC converter circuit 7 is shown in FIG. 5.

The PFC converter circuit 7 shown in the figure is a voltage-boosting converter adopting the PWM control method. The PFC converter circuit 7 operates at a power factor approaching 1 so as to stabilize the direct current input voltage Ei.

First of all, as shown in the figure, the alternative current input voltage VAC generated by the commercial alternative current power-supply AC is supplied to the input terminals of a bridge rectification circuit Di employed in the PFC converter circuit 7. An output capacitor Co is connected between the plus and minus lines of the bridge rectification circuit Di in parallel to the bridge. A rectified output generated by the bridge rectification circuit Di is supplied to the output capacitor Co. Thus, a direct current input voltage Ei is obtained between the terminals of the output capacitor Co as shown in the figure.

The direct current input voltage Ei is supplied to the main power-supply circuit 2 and the inverter circuit 4 as shown in FIG. 4.

The configuration for improving the power factor as shown in the figure includes an inductor L, a high-speed recovery diode D and a switching circuit Q3.

The inductor L and the high-speed recovery diode D are connected as a series circuit between the plus output terminal of the bridge rectification circuit Di and the plus terminal of the output capacitor Co.

A MOS-FET is selected as the switching device Q3. As shown in the figure, the switching device Q3 is connected between the minus line of the bridge rectification circuit Di and a point of connection between the inductor L and the high-speed recovery diode D.

The switching device Q3 is driven by a driving control circuit not shown in the figure.

The driving control circuit typically executes PWM control based on the alternative current input voltage VAC and differentials of the direct current input voltage Ei to change the on duration of the switching device Q3. The on duration of the switching device Q3 is referred to as the duty of the switching device Q3. As a result of the control, the waveform of an alternative current input current flowing to the bridge rectification circuit Di matches the waveform of the alternative current input voltage VAC. That is to say, the power factor is improved in order to approach 1.

In addition, in this case, the duty (or the on duration) of the switching device Q3 changes also in accordance with differentials of the direct current input voltage Ei. Thus, variations in direct current input voltage Ei are also suppressed. That is to say, the direct current input voltage Ei is stabilized thereby.

Also in this modified version of the power-supply apparatus 11, the inverter circuit 4 generates an alternative current voltage for driving the backlight section not through the main power-supply circuit 2. Thus, the power loss incurred in a process to generate an alternative current voltage for driving the backlight section can be reduced to a quantity smaller than that of the conventional configuration. That is to say, in this case, in comparison with the conventional configuration shown in FIG. 7, the power loss is small even if a circuit equivalent to the PFC converter circuit 7 is employed in the conventional configuration.

In addition, in the case of the configuration employing the PFC converter circuit 7, the direct current input voltage Ei supplied to the main power-supply circuit 2 and the inverter circuit 4 is stabilized. Thus, the inverter circuit 4 can be designed on the assumption that a stable direct current input voltage is supplied to the inverter circuit 4. As a result, since the design of the inverter circuit 4 is simpler, the inverter circuit 4 is very advantageous from the practical point of view if its combination with the configuration for improving the power factor is to be taken into consideration.

FIG. 6 is a circuit diagram showing a simplified configuration of a power-supply apparatus 12 according to a second embodiment of the present invention. It is to be noted that sections shown in FIG. 6 as sections identical with their respective counterparts shown in FIG. 1 are denoted by the same reference numerals as the counterparts, and their explanations are not repeated.

The power-supply apparatus 12 shown in FIG. 6 is also used as a power-supply section of a liquid crystal display apparatus 21. That is to say, the power-supply apparatus 12 supplies driving power to the load 3 and a backlight section 15 as shown in the figure.

In addition, in this case, the backlight section 15 of the liquid crystal display apparatus 21 employs LEDs. The power-supply apparatus 12 supplies direct current driving currents to the backlight section 15.

A configuration for supplying direct current driving currents to the backlight section 15 includes a plurality of DC-DC converters 9a, 9b and 9c.

In this case, the backlight section 15 has a plurality of series circuits each including a predetermined plurality of LEDs connected to each other in series. As the series circuits for supplying a direct current to the series circuits including a predetermined plurality of LEDs receptively, a plurality of the DC-DC converters 9a, 9b and 9c are provided.

As shown in the figure, a direct current input voltage generated by the rectification/smoothing section 1 is supplied to the primary sides of the DC-DC converters 9a, 9b and 9c, and the primary sides of the DC-DC converters 9a, 9b and 9c are not isolated from the commercial alternative current power-supply AC. That is to say, much like the inverter circuit 4 employed in the configuration shown in FIG. 1, the DC-DC converters 9a, 9b and 9c are connected to the rectification/smoothing section 1 in parallel to the main power-supply circuit 2.

In addition, almost in the same way as the configuration of the main power-supply circuit 2, each of the DC-DC converters 9a, 9b and 9c includes an isolation transformer for isolating the commercial alternative current power-supply side and the load side from each other. On the primary side of the isolation transformer, a switching device and a driving circuit for driving the switching device are provided and, on the secondary side of the isolation transformer, a rectification/smoothing circuit is provided to form the configuration of a switching converter. That is to say, the direct current input voltage supplied to the primary side is subjected to a DC-DC power conversion process to generate another direct current voltage on the secondary side.

In addition, each of the DC-DC converters 9a, 9b and 9c also includes a control system for stabilizing a direct current to be supplied to the series circuit composed of a predetermined plurality of LEDs. Such a current stabilization control system typically has a detection circuit 4d, 4e and 4f for detecting the level of a current flowing through the series circuit of the LEDs and a feedback circuit 4g, 4h and 4i for feeding back a voltage detected by the detection circuit to the primary side through the isolation provided by the isolation transformer. In this configuration, in accordance with the voltage detected by the detection circuit and supplied by the feedback circuit, the switching frequency of a driving signal supplied by the driving circuit to the switching device is changed under control executed by the driving circuit.

Also in the configuration of the power-supply apparatus 12 according to the second embodiment described above, the power conversion means for generating a power-supply voltage for driving the backlight section employed in the liquid crystal display apparatus is not provided at a stage behind the main power-supply circuit 2, but provided in parallel to the main power-supply circuit 2 at a stage behind the rectification/smoothing section 1. That is to say, also in the configuration of the power-supply apparatus 12 according to the second embodiment, the power-supply voltage for driving the backlight section can be obtained by carrying out a power conversion process only once in each of the DC-DC converters 9a, 9b and 9c. Thus, the power loss incurred by the power-supply apparatus can be reduced to a value smaller than that of the conventional configuration shown in FIG. 8.

In addition, also in the power-supply apparatus 12 according to the second embodiment, a direct current voltage for driving the backlight section 15 can be obtained not through the main power-supply circuit 2. Thus, it is no longer necessary to cope with an increased power consumed by the main power-supply circuit 2 as a power caused by an increased size of the display apparatus.

On top of that, the DC-DC converters 9a, 9b and 9c are connected to the rectification/smoothing section 1 in parallel to the main power-supply circuit 2 as described above. Thus, also in the power-supply apparatus 12 according to the second embodiment, the larger the power consumption for driving the backlight section, the greater the obtained power-loss reduction effect in comparison with the configuration shown in FIG. 8 as the conventional configuration.

In addition, also in this case, the main power-supply circuit 2 no longer needs to supply power to the backlight section 15. Thus, the power-supply specifications of the main power-supply circuit 2 need to rely only on conditions of the load 3.

It is to be noted that, in the second embodiment, a plurality of DC-DC converters 9 connected in parallel is provided. This is because, if a plurality of LEDs connected to each other to form a series circuit is to be driven by only one DC-DC converter 9, the size of the DC-DC converter 9 will increase as is the case with the configuration shown in FIG. 8 as a configuration in which, if a plurality of LEDs connected to each other to form a series circuit is to be driven by only one chopper regulator 109, the size of the chopper regulator 109 will increase.

In addition, particularly in this case, a plurality of DC-DC converters 9 is connected to form a parallel circuit. Thus, in comparison with a configuration employing only one DC-DC converter 9, for each of the DC-DC converters 9, the core size and endurance voltage of the isolation transformer can be reduced to result in a compact device. As a result, the increase of the total size of the DC-DC converters 9a, 9b and 9c can be made infinitesimal.

On top of that, in the same way as the modified versions described earlier by referring to FIGS. 4 and 5, the power-supply apparatus 12 according to the second embodiment may employ a PFC converter circuit 7 as a substitute for the rectification/smoothing section 1 even though the power-supply apparatus 12 employing a PFC converter circuit 7 is not shown in any of the figures.

The second embodiment implements a typical configuration in which a plurality of LEDs is provided to form series connection circuits each associated with a DC-DC converter 9. In place of such a configuration, for series circuits each including a plurality of LEDs, only one DC-DC converter can also be connected to the rectification/smoothing section 1 in parallel to the main power-supply circuit 2. In this case, a plurality of isolation transformers each associated with one series circuit is provided in parallel inside the DC-DC converter 9 to form a plurality of DC-voltage generation systems. On the secondary side of each of the isolation transformers in the direct current-voltage generation systems, a direct current voltage is generated for the series circuit associated with the isolation transformer.

As another alternative, only one DC-DC converter can also be connected to the rectification/smoothing section 1 in parallel to the main power-supply circuit 2, but a plurality of isolation transformers each associated with one series circuit is provided to form a series circuit inside the DC-DC converter 9 to form a plurality of direct current-voltage generation systems on the secondary side.

In the case of a DC-DC converter 9 including a plurality of isolation transformers as described above, on the secondary side of each of the transformers, the level of a current flowing through a series circuit of LEDs is typically detected and, in accordance with the result of the detection, the voltage generated on the secondary side is stabilized. If such a configuration is adopted, much like a plurality of DC-DC converters 9 forming a parallel circuit, a direct current flowing through every series circuit of LEDs can be stabilized.

It is to be noted that, in accordance with the embodiments explained so far, the power-supply apparatus provided by the present invention functions as a power-supply section of a liquid crystal display apparatus. In these embodiments, the inverter circuit 4 or the DC-DC converter 9 generates respectively an alternative current voltage or direct current voltage for driving the backlight section. However, the present invention can also be applied to a wide range of configurations in which, for example, a second power conversion means generates an alternative current or direct current power-supply voltage for driving a load other than the backlight section.

In addition, in the embodiments, a transformer employed in the inverter circuit 4 or the DC-DC converter 9 can be an electromagnetic transformer or a piezo-electric transformer.

The invention claimed is:

1. A display apparatus having a backlight section and a load other than said backlight section, said display apparatus comprising:

an input-voltage generation section for generating a direct current input voltage from an alternating current;

a first power conversion section for receiving said direct current input voltage, and for carrying out a DC-DC power conversion process on the direct current input voltage to generate a direct current power-supply voltage to be supplied to said load;

a second power conversion section connected in parallel with said first power conversion section, and including:

a primary side for receiving said direct current input voltage, and including:

a pair of series connected switches for switching the direct current input voltage to generate an alternating current input voltage *being* supplied to a primary winding of at least one transformer, and a driving circuit for driving said pair of series connected switches, a secondary side, isolated from said primary side by said at least one transformer, for generating, from an alternating current output voltage supplied by a secondary winding of the at least one transformer, a power-supply voltage to be supplied to a plurality of parallel connected backlights of said backlight section, a *voltage* detection circuit connected in series with only one of the plurality of parallel connected backlights for detecting a voltage supplied to that backlight, and a feedback section for receiving the detected voltage from said *voltage* detection circuit, for rectifying the detected voltage, and for supplying the rectified voltage to said driving circuit of said primary side of said second power conversion section, said driving circuit controlling the quantity of light emitted by the plurality of parallel connected backlights to a constant value based on the rectified voltage; and a display section for displaying a picture using said backlight section.

2. A display apparatus according to claim 1, wherein the at least one transformer includes a plurality of transformers each associated with a respective portion of the plurality of parallel connected backlights of said backlight section.

3. A display apparatus according to claim 1, wherein a plurality of parallel connected fluorescent tubes [is] *are* employed as the plurality of parallel connected backlights of said backlight section, and said secondary side of said second power conversion section generates the power-supply voltage to be supplied to each of said parallel connected fluorescent tubes.

4. A display apparatus according to claim 1, wherein said input-voltage generation section includes a rectification/smoothing circuit having a plurality of diodes for rectifying the alternating current, and a capacitor for smoothing a rectified output of said plurality of diodes, and said input-voltage generation section generates said direct current input voltage as a voltage appearing between terminals of said capacitor.

5. A display apparatus according to claim 1, wherein said input-voltage generation section includes a power-factor improvement converter for generating a stabilized direct current output voltage as the direct current input voltage.

6. A display apparatus according to claim 1, wherein said feedback section isolates the primary and secondary sides of the second power conversion section from each other.

7. A display apparatus having a backlight section and a load other than the backlight section, the display apparatus comprising:

an input-voltage generation section which generates a direct current input voltage from an alternating current;

a first power conversion section which receives the direct current input voltage, and carries out a DC-DC power conversion process on the direct current input voltage to generate a direct current power-supply voltage to be supplied to the load;

a second power conversion section connected in parallel with the first power conversion section, and including:

a primary side which receives the direct current input voltage, and including:

a pair of series connected switches which switches the direct current input voltage to generate an alternating current input voltage *being* supplied to a primary winding of at least one transformer, and a driving circuit which drives the pair of series connected switches, a secondary side, isolated from the primary side by the at least one transformer, which generates, from an alternating current output voltage supplied by a secondary winding of the at least one transformer, a power-supply voltage to be supplied to a plurality of parallel connected backlights of the backlight section, a *voltage* detection circuit connected in series with only one of the plurality of parallel connected backlights for detecting a voltage supplied to that backlight, and a feedback section which receives the detected voltage from the *voltage* detection circuit, rectifies the detected voltage, and supplies the rectified voltage to the driving circuit of the primary side of the second power conversion section, the driving circuit controlling the quantity of light emitted by the plurality of parallel connected backlights to a constant value based on the rectified voltage; and a display section which displays a picture using the backlight section.

8. A display apparatus according to claim 7, wherein the at least one transformer includes a plurality of transformers each associated with a respective portion of the plurality of parallel connected backlights of the backlight section.

9. A display apparatus according to claim 7, wherein a plurality of parallel connected fluorescent tubes is employed as the plurality of parallel connected backlights of the backlight section.

10. A display apparatus according to claim 7, wherein the input-voltage generation section includes a rectification/smoothing circuit having a plurality of diodes which rectify the alternating current, and a capacitor which [smoothes] *smooths* a rectified output of the plurality of diodes, and the input-voltage generation section generates the direct current input voltage as a voltage appearing between terminals of the capacitor.

11. A display apparatus according to claim 7, wherein the input-voltage generation section includes a power-factor improvement converter which generates a stabilized direct current output voltage as the direct current input voltage.

12. A display apparatus according to claim 7, wherein the feedback section isolates the primary and secondary sides of the second power conversion section from each other.

*13. A display apparatus having a backlight section and a load other than the backlight section, the display apparatus comprising:*

*an input-voltage generation section for generating a direct current input voltage from an alternating current;*

*a first power conversion section for generating a direct current power-supply voltage to be supplied to the load;*

*a second power conversion section connected in parallel with the first power conversion section, and including:*

*a primary side for receiving the direct current input voltage, and including:*

*a pair of series connected switches for switching the direct current input voltage to generate an alternating current input voltage being supplied to a primary winding of at least one transformer,*

*a driving circuit for driving the pair of series connected switches,*

*a secondary side, isolated from the primary side by the at least one transformer, for generating, from an alternating current output voltage supplied by a secondary winding of the at least one transformer, a power-supply voltage to be supplied to a plurality of parallel connected backlights of the backlight section,*

*a voltage detection circuit connected in series with one of the plurality of parallel connected backlights for detecting a voltage supplied to that backlight,*

*a feedback section for receiving the detected voltage from the voltage detection circuit, for adjusting the detected voltage to generate an adjusted optical signal voltage, and for supplying the adjusted optical signal voltage to the driving circuit of the primary side of the second power conversion section, and*

*the driving circuit controlling the quantity of light emitted by the plurality of parallel connected backlights to a constant value based on the adjusted optical signal voltage; and*

*a display section for displaying a picture using the backlight section.*

*14. A display apparatus according to claim 13, wherein the at least one transformer is a plurality of transformers each associated with a respective portion of the plurality of parallel connected backlights of the backlight section.*

*15. A display apparatus according to claim 14, wherein the plurality of transformers are parallel connected with respect to one another.*

*16. A display apparatus according to claim 13, wherein the at least one transformer includes a plurality of secondary windings each associated with a respective portion of the plurality of parallel connected backlights of the backlight section.*

*17. A display apparatus according to claim 13, wherein a plurality of parallel connected fluorescent tubes are employed as the plurality of parallel connected backlights of the backlight section, and the secondary side of the second power conversion section generates the power-supply voltage to be supplied to each of the parallel connected fluorescent tubes.*

*18. A display apparatus according to claim 13, wherein the input-voltage generation section includes a power-factor improvement converter for generating a stabilized direct current output voltage as the direct current input voltage.*

*19. A display apparatus according to claim 13, wherein a junction located between the pair of series connected switches is connected to a first terminal of the primary winding of the at least one transformer, and a terminal of the pair of series connected switches is connected through a capacitor to a second terminal of the primary winding of the at least one transformer.*

*20. A display apparatus according to claim 13, wherein the junction point between the switches is connected to the primary winding, and wherein one terminal of the switches is electrically connected to the primary winding by a capacitor.*

*21. A power-supply apparatus for generating a direct current power-supply voltage having a backlight section and a load other than the backlight section, the power-supply apparatus comprising:*

*an input-voltage generation section for generating a direct current input voltage from an alternating current;*

*a first power conversion section for generating a direct current power-supply voltage to be supplied to the load;*

*a second power conversion section connected in parallel with the first power conversion section, and including:*

*a first power-supply side for receiving the direct current input voltage, and including:*

*a pair of series connected switches for switching the direct current input voltage to generate an alternating current input voltage being supplied to a first winding of at least one transformer,*

*a driving circuit for driving the pair of series connected switches,*

*a second power-supply side, for generating, from an alternating current output voltage supplied by a second winding of the at least one transformer, a power-supply voltage to be supplied to a plurality of parallel connected the backlight section,*

*a voltage detection circuit connected in series with one of the plurality of parallel connected the backlight section for detecting a voltage supplied to the backlight section,*

*a feedback section for receiving the detected voltage from the voltage detection circuit, for adjusting the detected voltage to generate an adjusted optical signal voltage, and for supplying the adjusted optical signal voltage to the driving circuit of the first power-supply side of the second power conversion section, and*

*the driving circuit controlling the quantity of light emitted by the plurality of parallel connected backlights to a constant value based on the adjusted optical signal voltage; and*

*the backlight section driving a light source as the load.*

*22. A power-supply apparatus of claim 21, wherein the at least one transformer is a plurality of parallel connected transformers.*

* * * * *